S. D. SPRONG.
CALIBRATING DEVICE.
APPLICATION FILED FEB. 19, 1913.
1,090,419.
Patented Mar. 17, 1914.
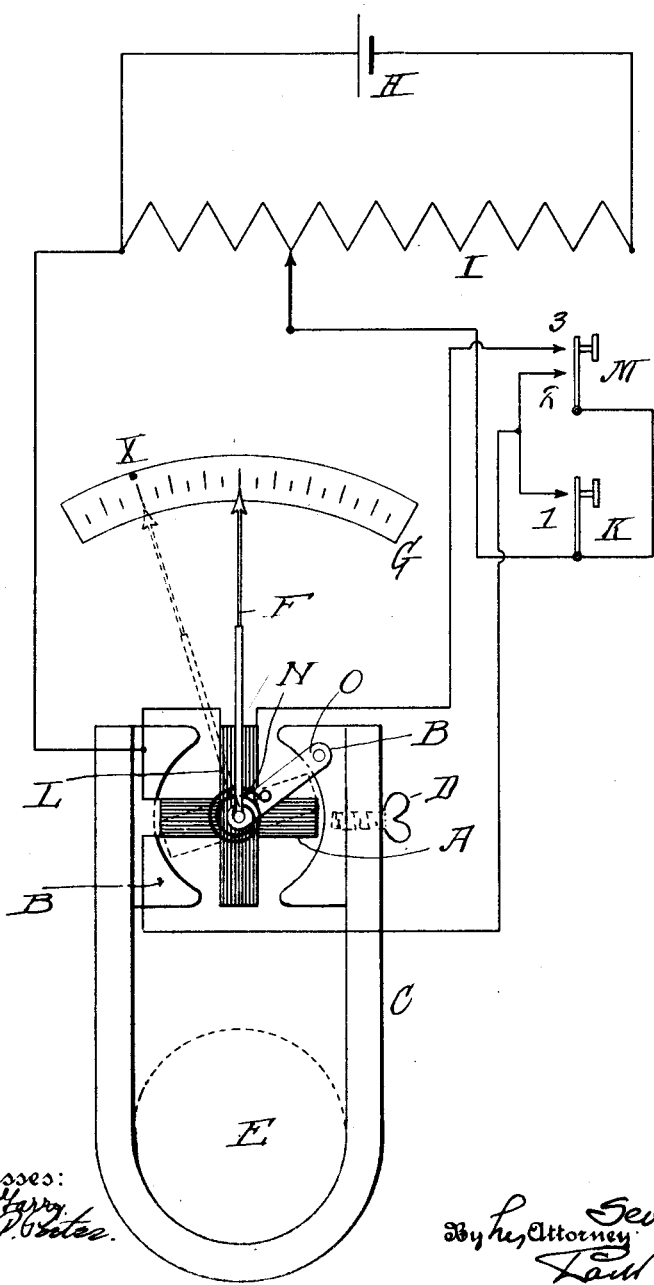

UNITED STATES PATENT OFFICE.

SEVERN D. SPRONG, OF BROOKLYN, NEW YORK.

CALIBRATING DEVICE.

1,090,419.   Specification of Letters Patent.   Patented Mar. 17, 1914.

Application filed February 19, 1913. Serial No. 749,482.

*To all whom it may concern:*

Be it known that I, SEVERN D. SPRONG, a citizen of the United States, residing at Brooklyn, in the county of Kings and State of New York, have invented a certain new and useful Improvement in Calibrating Devices, of which the following is a specification.

The invention is a calibrating device for electric measuring apparatus, and more particularly for apparatus of the type in which the current is measured by the mutual reaction of two fields, one of said fields being constant and produced around a movable member—which may be a pivoted coil—and the other of said fields being produced by induction from an external conductor conveying the current to be measured and hence variable correspondingly to said current. The angular displacement of said pivoted coil being resiliently opposed, said coil finally takes a position of balance, and the extent of its travel in passing to said position then measures the inducing current aforesaid. Such a pivoted and spring-balanced coil is well known in the art, and is fully described in Letters Patent No. 392,387, granted to Edward Weston, November 6, 1888.

In my present device, I provide a second and fixed coil, which incloses the movable coil and is disposed at an angle thereto, both of said coils being connected in parallel circuit to a constant voltaic cell, so that the movable coil when the circuit is closed through both coils is angularly displaced by the mutual reaction of the fields of said coils. I also connect in circuit a variable resistance and suitable switches by which I can divert the cell current either into the movable coil only, or into both coils in parallel. In originally calibrating the instrument, the current is switched into both coils through a maximum selected resistance, and the index movement noted. In event of weakening of the cell current, the original index reading is restored by cutting out variable resistance, and the instrument thus recalibrated.

The accompanying drawing is an electrical diagram.

A is the pivoted coil, disposed between the concave blocks B (dotted lines) of magnetic material, to which are secured the extremities of the flexible loop C of similar material, one of said extremities being permanently attached and the other detachably fastened by the screw D. In using the instrument, the screw D is released from the adjacent block, so that the loop C can be placed over the conductor E, indicated by a dotted circle, which is conveying the current to be measured. The coil A carries an index needle F, moving over a scale G.

H is a voltaic cell, connected through a variable resistance I, switch lever K and contact 1 to the terminals of coil A. Hence when switch lever K is closed, circuit is established from cell H through coil A, and the reaction of the resulting field with the field surrounding said coil induced from conductor E determines the angular displacement of coil A, and corresponding movement of the index F over scale G, which may be marked in suitable units. The movement of coil A is opposed by a coiled spring N connected at one end to the shaft of said coil and at the other end to an arm O attached to one of the blocks B.

The apparatus above specifically described is not of my invention and is not claimed by me herein.

It is obvious that as the cell continues in use, its energy will gradually decrease, and that hence it will be necessary to correct the instrument to allow for the resulting non-constancy of current. This I accomplish as follows: I provide a second and fixed coil L, supported at right angles to and inclosing movable coil A, the pivot-shaft of which is carried through openings in said fixed coil so that it may freely turn therein. I also provide a second switch lever M which coöperates with contacts 2 and 3. Switch levers M and K are connected, and so also are contacts 1 and 2. Lever M in closing contact at 2 establishes current through pivoted coil A, as already described. In closing contact at 3, it closes circuit through the fixed coil L, which is obviously in parallel with pivoted coil A. If, therefore, lever M be closed, there will be mutual reaction between the fields of the two coils, with the result that the pivoted coil will be rotated over an angle, depending upon the current strength of the cell H. That, of course, will depend upon the resistance in circuit. Therefore at the outset when the cell is new and delivering its maximum current, the variable resistance is set to interpose a selected maximum resistance, and the position of the needle on the scale is noted and marked at say the point X, which may be termed the calibration point. In course of time, the cell current falls off, so that it is found that when the switch lever M is closed, the needle does not move to calibration point X, but to some point between point X and the zero mark. The variable resistance is then adjusted to cut resistance out of the cell circuit, until the needle once more indicates X, and the instrument is thus brought back to its normal calibration. This continues until all or nearly all of the variable resistance is cut out, when the cell is replaced by a new one.

It will be understood that for ordinary purposes of current measurement, the switch lever K only is used, and that the switch lever M is used for the purpose of calibration, as described.

I claim:

1. An electric measuring instrument, comprising a current generator, a fixed coil, a movable coil, means whereby the movable coil is subjected to a flux surrounding a conductor whose current is to be measured, means for indicating the angular displacement of said movable coil due to the mutual reaction of the fields of said coils, and means whereby said two coils may be included in parallel or the movable coil only included in the circuit of said generator.

2. An electric measuring instrument, comprising a current generator, a pivoted coil, a fixed coil set in a plane at an angle to the plane of said pivoted coil, means whereby said coils are subjected to a flux surrounding a conductor whose current is to be measured, means for indicating the angular displacement of said pivoted coil due to the mutual reaction of the fields of said coils, and means whereby said two coils may be included in parallel or the pivoted coil only included in the circuit of said generator.

3. An electric measuring instrument, comprising a current generator, a pivoted coil, a fixed coil set in a plane at an angle to the plane of said pivoted coil, means whereby said coils are subjected to a flux surrounding a conductor whose current is to be measured, means for indicating the angular displacement of said pivoted coil due to the mutual reaction of the fields of said coils, means whereby said two coils may be included in parallel or the pivoted coil only included in the circuit of said generator, and a variable resistance included in said generator circuit.

In testimony whereof I have affixed my signature in presence of two witnesses.

SEVERN D. SPRONG.

Witnesses:
GERTRUDE T. PORTER,
MAY T. McGARRY.